(12) United States Patent
Lee et al.

(10) Patent No.: US 8,013,063 B2
(45) Date of Patent: Sep. 6, 2011

(54) ACRYL-SILICONE HYBRID IMPACT MODIFIERS AND VINYL CHLORIDE RESIN COMPOSITIONS HAVING THE SAME

(75) Inventors: Kwang-jin Lee, Busan (KR); Jeong-heon Ahn, Suncheon (KR); Hye-kyong Lee, Jeollabuk-do (KR)

(73) Assignee: LG Chem, Ltd. (KR)

( * ) Notice: Subject to any disclaimer, the term of this patent is extended or adjusted under 35 U.S.C. 154(b) by 738 days.

(21) Appl. No.: 10/567,000

(22) PCT Filed: May 13, 2004

(86) PCT No.: PCT/KR2004/001113
§ 371 (c)(1),
(2), (4) Date: Feb. 1, 2006

(87) PCT Pub. No.: WO2005/012392
PCT Pub. Date: Feb. 10, 2005

(65) Prior Publication Data
US 2007/0021557 A1 Jan. 25, 2007

(30) Foreign Application Priority Data
Aug. 2, 2003 (KR) .................. 10-2003-0053585

(51) Int. Cl.
*C08F 30/08* (2006.01)
*C08F 30/00* (2006.01)

(52) U.S. Cl. .......... 525/100; 525/63; 525/191; 525/418; 525/474; 525/479; 525/902

(58) Field of Classification Search ............ 525/63, 525/64, 69, 100, 191, 209, 210, 474, 471, 525/902, 242, 243, 298, 302, 313
See application file for complete search history.

(56) References Cited

U.S. PATENT DOCUMENTS

| | | | | |
|---|---|---|---|---|
| 4,278,576 A | * | 7/1981 | Goldman | 523/201 |
| 5,132,359 A | | 7/1992 | Sasaki et al. | 525/63 |
| 5,298,559 A | * | 3/1994 | Fujii et al. | 525/67 |
| 5,804,655 A | * | 9/1998 | Miyatake et al. | 525/69 |
| 6,153,694 A | | 11/2000 | Miyatake et al. | 525/63 |
| 6,730,734 B1 | * | 5/2004 | Hamilton et al. | 524/523 |

FOREIGN PATENT DOCUMENTS

| | | |
|---|---|---|
| JP | 4-272952 | 9/1992 |
| JP | 10-212387 | 8/1998 |
| JP | 2000212231 | 8/2000 |
| JP | 2002-173501 | 6/2002 |
| JP | 2002317094 | 10/2002 |
| JP | 2001323033 | 11/2002 |
| JP | 2002327027 | 11/2002 |
| JP | 2003-96142 | 4/2003 |
| JP | 2003-137946 | 5/2003 |
| WO | WO 2004058839 A1 * | 7/2004 |

* cited by examiner

*Primary Examiner* — Irina S Zemel
*Assistant Examiner* — Jeffrey Lenihan
(74) *Attorney, Agent, or Firm* — Cantor Colburn LLP

(57) ABSTRACT

The present invention relates to acryl-silicone hybrid impact modifiers, the method of their manufacture, and vinyl chloride resin compositions containing the above. The acryl-silicone hybrid impact modifier of the present invention contains a seed obtained through emulsion copolymerization of vinyl monomers and hydrophilic monomers; an acryl-silicone hybrid rubber core covering the seed in which a polyorganosiloxane rubber phase is dispersed locally onto the inner part and surface of the acrylic rubber core containing alkyl acrylate polymers and a shell covering the above rubber core and containing alkyl methacrylate polymers. Thermoplastic resins containing the above, particularly by being added to vinyl chloride resins, they have effects of granting superior impact resistance, weatherability, and high gloss.

7 Claims, No Drawings

ACRYL-SILICONE HYBRID IMPACT MODIFIERS AND VINYL CHLORIDE RESIN COMPOSITIONS HAVING THE SAME

TECHNICAL FIELD

The present invention relates to acryl-silicone hybrid impact modifiers, a method for preparing the same, and vinyl chloride resin compositions containing the same. In particular, the present invention relates to acryl-silicone hybrid impact modifiers having superior impact resistance, weatherability, and high-gloss characteristic and a method for preparing the same and vinyl chloride resin compositions containing the same.

BACKGROUND ART

Impact modifiers used in order to improve the impact resistance of vinyl chloride resins include methylmethacrylate butadiene styrene (MBS) resins, chloroethylene (CPE) resins, acrylic resins, etc., where it is necessary to use rubber polymers having a low glass transition temperature (Tg) to the maximum in order to improve the impact resistant strength of thermoplastic resins.

Among them, in butadiene styrene resins, the polybutadiene rubber is more superior to polybutylacrylate, which is the rubber component of acrylic impact modifiers, in view of its impact resistance since the glass transition temperature (Tg) of the polybutadiene rubber is about −80° C., which is lower than the glass transition temperature (Tg) of polybutylacrylate, i.e., about −50° C.

However, the polybutadiene rubber is problematic in that it is thermally unstable since there are unsaturated double bonds. Therefore, acrylic resins having no unsaturated double bonds are used widely as the impact modifiers of outdoor plastic products that are exposed to the day light greatly since they have superior weatherability.

In other words, for the products requiring for impact resistance and waterproofing like window frames, etc., polymers having the core-shell structure in which methacrylate polymers that are compatible with vinyl chloride resins are grafted to the rubber core composed of alkyl acrylate are used mainly. However, the above polymers are problematic in that their impact-resistance improvement effects are insufficient since their glass transition temperature is higher than that of butadiene rubber.

In the meantime, polyorganosiloxanes, also known as polydimethylsiloxanes, are very effective polymers for the improvement of impact resistance since their glass transition temperature (Tg) is around −120° C., and therefore, it is expected to improve weatherability as well as impact resistance by using acryl-silicone hybrid rubber graft copolymer particles containing the silicone component.

The factors determining the physical properties of acryl-silicone hybrid impact modifiers having the core-shell structure include the rubber content of impact modifiers, size of rubber particles, distance between rubber particles, swelling index for the solvent, degree of bonding among impact modifier particles dispersed according to processing and matrix, etc. Particularly, bonding between an impact modifier and matrix is determined according to the grafting efficiency of the shell with respect to the core rubber of the impact modifier.

Acryl-silicone hybrid impact modifiers in order to improve the impact resistance of vinyl chloride resins are manufactured through the emulsion polymerization method usually, which include the following methods:

The first method is, as in the U.S. Pat. No. 5,132,359, a method of completing a core-shell structure by polymerizing polydimethylsiloxane rubber seeds firstly; charging butylacrylate monomers as the rubber core component in order to grow rubber particles, subsequently adding shell component monomers finally to cover the core surface finally.

The second method is, as in the U.S. Pat. No. 6,153,694, is a method of microagglomeration by polymerizing separately each of the polydimethylsiloxane rubber latex of less than 100 nm and the polybutylacrylate latex; growing them to particles of a desired size through agglomeration; and forming a core-shell structure by forming encapsulated shells finally.

Usually, shell polymerization is done through graft polymerization of methylmethacrylate monomers that may be compatible with vinyl chloride resins on the surface of the core, or through graft polymerization by adding a small amount of monomers having two or more functional groups. Particularly, methylmethacrylate assumes the role of improving the agglomeration characteristics of the latex since it is highly compatible to the matrix and has a relatively high glass transition temperature.

However, the above method is still disadvantageous in that it fails to have high impact-resistance improving effects and high-gloss characteristic but has a long polymerization time of organosiloxane polymers. Accordingly, in reality, vinyl chloride resins overcoming the above-described problems and having superior impact resistance, weatherability, and high-gloss characteristic simultaneously are demanded continuously.

DISCLOSURE OF INVENTION

It is, therefore, an object of the present invention to provide impact modifiers having superior impact resistance, weatherability, and gloss with a small amount of polyorganosiloxane having superior weatherability and high-temperature and low-temperature stability, the method of their manufacture, and vinyl chloride resins compositions containing the above.

Provided in the present invention are acryl-silicone hybrid impact modifiers comprised of 0.01 to 10 parts by weight of a seed composed of copolymers of vinyl monomers and hydrophilic monomers; 60 to 94 parts by weight of an acryl-silicone hybrid rubber core; and 6 to 40 parts by weight of a shell containing alkyl methacrylate.

The seed is comprised of 65 to 99 parts by weight of a vinyl monomer; 0.5 to 30 parts by weight of a hydrophilic monomer; and 0.5 to 5 parts by weight of a cross-linking monomer.

The vinyl monomer may be one or more kinds of compounds composed of styrene, α-methylstyrene, vinyl toluene, and 3,4-dichlorostyrene.

The hydrophilic monomer may be one or more kinds of compounds composed of alkyl acrylates such as ethylacrylate, butylacrylate, 2-ethylhexylacrylate, etc.; alkyl methacrylates such as methylmethacrylate, benzylmethacrylate, etc.; acrylonitrile, hydroxymethylmethacrylate, and glycidylmethacrylate.

The acryl-silicone hybrid rubber core is comprised of 55.0 to 97.5 parts by weight of an acrylic rubber core, and 2.5 to 45.0 parts by weight of a silicone rubber core.

The acrylic rubber core is comprised of 97.0 to 99.9 parts by weight of an alkyl acrylate of which alkyl group has 1 to 8 carbon atoms, and 0.1 to 3.0 parts by weight of a cross-linking monomer.

The alkyl acrylates may be one or more kinds of compounds selected from the group consisting of methylacrylate, ethylacrylate, propylacrylate, iso-propylacrylate, butylacrylate, hexylacrylate, octylacrylate, and 2-ethylhexylacrylate.

The silicone rubber core is comprised of 90.00 to 99.65 parts by weight of a cyclic organosiloxane containing 3 to 7 rings, 0.1 to 5.0 parts by weight of an organosilane cross-linking agent containing 1 to 4 alkoxy functional groups; and 0.25 to 5.0 parts by weight of an organosilane graft-linking agent having an alkyl acrylate or methacrylate which may be readily radical-polymerized with 1 to 3 alkoxy functional groups, mercaptane, and 0 to 2 alkyl groups.

The cyclic organosiloxane may be one or more kinds of compounds selected from the group consisting of hexamethylcyclotrisiloxane, octamethylcyclotetrasiloxane, decamethylcycloheptasiloxane, dodecamethylcyclohexasiloxane, trimethyltriphenylcyclotrisiloxane, tetramethyltetraphenylcyclotetrasiloxane, and octaphenylcyclotetrasiloxane.

The organosilane cross-linking agent may be one or more kinds of compounds selected from the group consisting of trimethoxymethylsilane, triethoxymethylsilane, triethoxyphenylsilane, tetramethoxysilane, tetraethoxysilane, tetranormalpropoxysilane, and tetrabutoxysilane.

The cross-linking monomer may be one or more kinds of compounds selected from the group consisting of divinylbenzene, 3-butanedioldiacrylate, 1,3-butanedioldimethacrylate, 1,4-butanedioldiacryalte, 1,4-butanedioldimethacrylate, allylacrylate, allylmethacrylate, trimethylolpropanetriacrylate, tetraethyleneglycoldiacrylate, and tetraethyleneglycoldimethacrylate.

The alkyl methacrylate may be an alkyl methacrylate of which alkyl group has 1 to 4 carbon atoms.

The shell may include additionally 0.1 to 20 parts by weight of one or more kinds of compounds selected from the group consisting of methylacrylate, ethylacrylate, butylacrylate, acrylonitrile, and methacrylonitrile as a supplementary monomer with respect to 100 parts by weight of the total monomers of the shell.

The glass transition temperature of the alkyl-silicone hybrid rubber core is −120° C. to 25° C.

The acryl-silicone hybrid rubber core has a morphology in which a discrete polyorganosiloxane rubber phase is dispersed locally onto the inner part and surface of a continuous acrylic rubber core.

The present invention also provides with a method of manufacture of acryl-silicone hybrid impact modifiers comprising the steps of:

a) manufacture of a seed latex through a cross-linking reaction by emulsion polymerization of an emulsion solution containing 0.01 to 10 parts by weight (based on the weight of an impact modifier monomer) of a seed composed of 65 to 99 parts by weight of a vinyl monomer, 0.5 to 30 parts by weight of a hydrophilic monomer, and 0.5 to 5 parts by weight of a cross-linking monomer;

b) manufacture of an acrylic rubber core through emulsion polymerization by adding an emulsion solution, containing 55.0 to 97.5 parts by weight of an acrylic rubber core (based on the weight of an acryl-silicone hybrid rubber core) composed of 97.0 to 99.9 parts by weight of an alkyl acrylate of which alkyl group has 1 to 8 carbon atoms and 0.1 to 3.0 parts by weight of a cross-linking monomer, to the above seed latex;

Manufacture of a silicone rubber core precursor composed of 90.00 to 99.65 parts by weight of a cyclic organosiloxane having 3 to 7 rings, 0.1 to 5.0 parts by weight of an organosilane cross-linking agent having 1 to 4 alkoxy functional groups, and 0.25 to 5.0 parts by weight of an organosilane graft-linking agent having an alkyl acrylate or methacrylate that may be readily radical-polymerized with 1 to 3 alkoxy functional groups, mercaptane, and 0 to 2 alkyl groups; and Manufacture of an acryl-silicone rubber core latex by swelling of 2.5 to 45.0 parts by weight of the above silicone rubber core precursor (based on the weight of an acryl-silicone hybrid rubber core) and performing a condensation reaction at a reaction temperature of 60° C. to 100° C. with an acidic catalyst; and c) manufacture of an acryl-silicone hybrid impact modifier latex by forming a hard shell onto the outside of the rubber core by adding an emulsion solution containing 6 to 40 parts by weight of an alkyl methacrylate of which alkyl group has 1 to 4 carbon atoms (based on the weight of an impact modifier monomer) to 60 to 94 parts by weight of the above acryl-silicone rubber core latex (based on the weight of the impact modifier monomer).

The present invention may further include a step of obtaining the impact modifier powder through coagulation of the impact modifier latex obtained in the above Step c) with an electrolyte, organic acid, or inorganic acid at a temperature of 0° C. to 100° C., filtration, and drying.

The present invention may still further include a step of obtaining the impact modifier powder by inputting a sodium alkyl sulphate solution to the impact modifier latex obtained in the above Step c), and inputting simultaneously a flow aid under operational conditions of the chamber inlet temperature of a spray-dryer of 135° C. to 225° C., the chamber outlet temperature of 30° C. to 90° C., and a rotary rotation speed of 5,000 rpm to 30,000 rpm.

The flow aid may be one or more kinds of compounds selected from the group consisting of calcium carbonate surface-coated with stearic acid or metallic stearic acid, clay, silica, titanium oxide, and a methacrylic copolymer.

The present invention still further provides with vinyl chloride resins containing 80 to 99 parts by weight of a vinyl chloride resin and 1 to 20 parts by weight of the above acryl-silicone hybrid impact modifier.

BEST MODE FOR CARRYING OUT THE INVENTION

The seed latex of the present invention is manufactured by reacting an emulsion solution containing i) 65 to 99 parts by weight of a vinyl monomer (based on the weight of a seed monomer); ii) 0.5 to 30 parts by weight of a hydrophilic monomer (based on the weight of the seed monomer); and iii) 0.5 to 5 parts by weight of a cross-linking monomer (based on the weight of the seed monomer) with respect to 100 parts by weight of the total seed monomers through emulsion polymerization.

It is preferable that the vinyl monomer used for manufacturing the seed latex of the present invention is one or more kinds of compounds selected from the group consisting of styrene, α-methylstyrene, vinyl toluene, and 3,4-dichlorostyrene.

It is preferable that the hydrophilic monomer used for manufacturing the seed latex of the present invention is one or more kinds of compounds selected from the group consisting of alkyl acrylates such as ethylacrylate, butylacrylate, 2-ethylhexylacrylate, and the like; alkyl methacrylates such as methylmethacrylate, benzylmethacrylate, and the like; acrylonitrile, hydroxylmethylmethacrylate, and glycidylmethacrylate.

It is preferable that the cross-linking monomer used for manufacturing the seed latex of the present invention is one or more kinds of compounds selected from the group consisting of divinylbenzene, 3-butanedioldiacrylate, 1,3-butanedioldimethacrylate, 1,4-butanedioldiacrylate, 1,4-butanedioldimethacrylate, allylacrylate, allylmethacrylate, trimethylolpropanetriacrylate, tetraethyleneglicoldiacrylate, and tetraethyleneglycoldimethacrylate. Particularly, it is desirable to use divinylbenzene in order to increase efficiently the degree of crosslinking of vinyl monomers.

Hereinafter, acryl-silicone hybrid rubber core will be described in detail.

In the manufacture of the acryl-silicone hybrid rubber core of the present invention, an acrylic rubber core latex is manufactured by adding i) 97.0 to 99.9 parts by weight of an alkyl acrylate of which alkyl group has 1 to 8 carbon atoms (based on the weight of an acrylic rubber core monomer), and ii) 55.0 to 97.5 parts by weight of an emulsion solution containing 0.1 to 3.0 parts by weight of a cross-linking monomer (based on the weight of an acrylic rubber core monomer) to a seed latex containing 0.01 to 10.0 parts by weight of the seed polymer manufactured in the above (based on the weight of the impact modifier monomer) and performing emulsion polymerization. It is quite natural that common emulsifying agents or polymerization initiator may be used for the above emulsion polymerization. The glass transition temperature (Tg) of the rubber core latex manufactured as described above is 25° C. or lower, preferably 0° C. or lower, or more preferably −40° C. or lower.

The alkyl acrylate may be one or more kinds of compounds selected from the group consisting of methylacrylate, ethylacrylate, propylacrylate, iso-propylacrylate, butylacrylate, hexylacrylate, octylacrylate, and 2-ethylhexylacrylate. Particularly, it is more preferable to use ethylacrylate, 2-ethylhexylacrylate, butylacrylate, or their mixture.

It is preferable that the above cross-linking monomer may be one or more kinds of compounds selected from the group consisting of 3-butanedioldiacrylate, 1,3-butanedioldimethacrylate, 1,4-butanedioldiacrylate, 1,4-butanedioldiacrylate, allylacrylate, allylmethacrylate, trimethylolpropanetriacrylate, tetraethyleneglycoldiacrylate, tetraethyleneglycoldimethacrylate, and divinylbenzene.

Particularly, it is more preferable to use 1,3-butanedioldiacrylate, 1,3-butanedioldimethacrylate, allylacrylate, allylmethacrylate, or their mixture.

It is desirable to use 0.1 to 3.0 parts by weight of the above cross-linking agent among monomers used for the rubber core layer of the present invention. If the content of the cross-linking agent is less than 0.1 parts by weight, the matrix and spherical particles may be deformed readily during polymer processing; and if it exceeds 3.0 parts by weight, the core may show a brittle characteristic and the impact modifying effects are lowered.

Then, an acryl-silicone hybrid rubber core having a morphology in which discrete organosiloxane polymers are dispersed locally onto the inner part and surface of the continuous acrylic rubber by swelling 2.5 to 45.0 parts by weight of an organosiloxane and silane precursor (based on the weight of an acryl-silicone hybrid rubber core composition) containing i) 90.00 to 99.65 parts by weight of a cyclic organosiloxane having 3 to 7 rings (based on the weight of a silicone rubber core precursor), ii) 0.1 to 5.0 parts by weight of an organosilane cross-linking agent having 1 to 4 alkoxy (1 or more carbon atoms) functional groups, and iii) 0.25 to 5.0 parts by weight of an organosilane graft-linking agent having an alkyl (1 or more carbon atoms) acrylate or methacrylate which may be readily radical-polymerized with 1 to 3 alkoxy (1 or more carbon atoms) functional groups, mercaptane, and 0 to 2 alkyl groups (1 or more carbon atoms) onto the above acrylic rubber core and performing a condensation reaction at a reaction temperature of 60° C. to 100° C. with an acidic catalyst.

It is possible to improve impact resistance, weatherability, and gloss with a small amount of organosiloxane polymers, since a hybrid core having such morphology can lower the glass transition temperature of the entire impact modifier owing to the polydimethylsiloxane rubber having a low glass transition temperature dispersed inside of the acrylic rubber core.

The condensation reaction temperature of the above organosilicone polymers is generally 50° C. to 130° C., preferably 60° C. to 90° C. The sulfonic acid form is widely used for a reaction acidic catalyst. For example, alkylbenzenesulfonic acid or alkylsulfonic acid is used along with an emulsifying agent such as a metallic alkylbenzenesulfonate or metallic alkylsulfonic acid. Dodecyl benzene sulfonic acid (DBS) assuming the role of an acidic catalyst and an emulsifying agent simultaneously is used most generally.

The cyclic organosiloxane having 3 to 7 rings may be one or more kinds of compounds selected from the group consisting of hexamethylcyclotrisiloxane, octamethylcyclotetrasiloxane, decamethylcycloheptasiloxane, dodecamethylcyclohexasiloxane, trimethyltriphenylcyclotrisiloxane, tetramethyltetraphenylcyclotetrasiloxane, and octaphenylcyclotetrasiloxane. Particularly, it is more preferable to use octamethylcyclotetrasiloxane, decamethylcycloheptasiloxane, dodecamethylcyclohexasiloxane, or their mixture.

The organosilane cross-linking agent containing 1 to 4 alkoxy (1 or more carbon atoms) functional groups may be one or more kinds of compounds selected from the group consisting of trimethyoxymethylsilane, triethoxymethylsilane, triethyoxyphenylsilane, tetramethoxysilane, tetraethoxysilane, tetranormalpropoxysilane, and tetrabutoxysilane. It is preferable to use 0.1 to 5.0 parts by weight of the above organosilane cross-linking agent among precursors used for the silicone rubber core layer of the present invention. If the content of the cross-linking agent is less than 0.1 parts by weight, the effects of improving the impact resistance are minor; and if it exceeds 5.0 parts by weight, the brittle characteristic is shown and the impact modifying effects are lowered.

The organosilane graft-linking agent having an alkyl (1 or more carbon atoms) acrylate or methacrylate which may be readily radical-polymerized with 1 to 3 alkoxy (1 or more carbon atoms) functional groups, mercaptane, and 0 to 2 alkyl groups (1 or more carbon atoms) may be one or more kinds of compounds selected from the group consisting of β-methacryloloxyethyldimethoxymethylsilane, γ-methacryloloxypropyldimethoxymethylsilane, γ-methacryloloxypropyldiethoxymethylsilane, γ-methacryloloxypropyltrimethoxysilane, γ-methacryloloxypropyltriethyoxysilane, γ-methacryloloxypropylmethoxydimethylsilane, γ-methacryloloxypropylethyoxydimethylsilane, γ-methacryloloxypropylethoxydiethylsilane, and δ-methacryloloxybutylethyoxymethylsilane.

It is preferable to use 0.25 to 5.0 parts by weight of the organosilane graft-linking agent among precursors used for the silicon rubber core layer of the present invention. If the content of the organosilane graft-linking agent is less than 0.25 parts by weight, impact resistance and gloss may be reduced since the grafting efficiency of the hard shell is reduced, and therefore, dispersion within the matrix is lowered; and if it exceeds 5.0 parts by weight, it may be disadvantageous in view of its price.

The siloxane linkage (O—Si—O) during the organosiloxane polymer condensation polymerization under the acidic conditions is in the equilibrium state between bonding and dissociation. Dissociation is advantageous at a high temperature, but the reaction is progressed toward the bonding reaction at a low temperature. Therefore, in order to obtain polydimethylsiloxane rubber having a high molecular weight and a high cross-linking density, reactants are polymerized at a temperature of 60° C. or higher, cooled to a low temperature and kept there for about 24 to 120 hours, and neutralized with an aqueous solution of sodium hydroxide, potassium hydroxide, or sodium carbonate.

Next, illustrated below is how shells are formed:

As to the shell of the present invention, an acryl-silicone hybrid impact modifier latex is manufactured through emulsion graft polymerization by adding 6 to 40 parts by weight of an emulsion solution containing an alkyl methacrylate of which alkyl group has 1 to 4 carbon atoms (based on the weight of an impact modifier monomer) to 60 to 94 parts by weight of the acryl-silicone rubber core latex containing a silicone rubber core (based on the weight of the impact modifier monomer) and forming the hard shell on the outer side of the rubber core.

Of course, common emulsifying agents or polymerization initiator may be used for the emulsion graft polymerization.

Shell graft polymerization is performed by grafting an alkyl methacrylate monomer such as methylmethacrylate, which may be compatible with the vinyl chloride resin, to the surface of a rubber core so as to cover the rubber core. Particularly, methylmethacrylate assumes the role of improving the agglomeration characteristics of the final acrylic impact modifier, since it has a relatively high glass transition temperature and accelerates dispersion of impact modifier particles during polymer processing since it has a superior compatibility with the matrix of the vinyl chloride resin.

In order to adjust the glass transition temperature of the shell components, other monomers which may be alkyl acrylate such as methylacrylate, ethylacrylate, butylacrylate, etc. or that having the nitrile component such as acrylonitrile, methacrylonitrile, etc. may be used additionally in order to further increase the compatibility with the matrix. One or more kinds of monomers may be selected and used within 0.1 to 20 parts by weight based on 100 parts by weight of the total shell monomers.

In order for the acryl-silicone hybrid impact modifier of the present invention to be manufactured in the powder form finally, the latex thus manufactured is agglomerated with an electrolyte, organic acid, or inorganic acid, filtered, and dried. It may be also manufactured in the spray-drying method. An inorganic substance such as calcium chloride, magnesium sulfate, etc. may be used for an electrolyte during agglomeration as in the method of agglomeration of usual acrylic impact modifier latexes.

The spray-drying method of the acryl-silicone hybrid impact modifier manufactured in the present invention is illustrated below: A sodium alkyl sulphate solution is introduced into the acryl-silicone hybrid impact modifier latex. The above latex is transferred into a spray-dryer at a constant feed rate, and a flow aid is sprayed into an air-ventilation inlet simultaneously. During spray drying, a flow air is mixed into simultaneously under the operational conditions of the chamber inlet temperature of 135° C. to 225° C., the chamber outlet temperature of 30° C. to 90° C., and the rotary rotation speed of 5,000 rpm to 30,000 rpm. Under the above conditions, the impact modifier powder having a superior flowing property and no compression is obtained. The flow aid may be one or more kinds of compounds selected from the group consisting of calcium carbonate of which surface is treated with stearic acid or metallic stearic acid, clay, silica, titanium oxide, and methacrylic copolymers having a high glass transition temperature.

Upon being added to the vinyl chloride resins, the acryl-silicone hybrid impact modifier powder thus manufactured exhibits superior impact resistance, weatherability, and high gloss since it is dispersed well into the vinyl chloride resin, which is the matrix resin, and satisfies the rubber content, glass transition temperature, particle size, and distance between impact modifiers particles, which are important factors of impact resistance, simultaneously.

Particularly, it is very useful for manufacturing of the products using vinyl chloride resins that require for all of efficient milling, impact resistance, and weatherability such as PVC siding, PVC window profiles, etc. As to the amount of addition of the acryl-silicone hybrid impact modifier of the present invention with respect to the amount of the vinyl chloride resin, it is preferable to add 1 to 20 parts by weight of the impact modifier with respect to 80 to 99 parts by weight of the vinyl chloride resin in view of the milling work, impact resistance, weatherability, gloss, and economy.

The foregoing and other objects, aspects, and advantages will be better understood from the following detailed description of preferred embodiments and comparative examples of the present invention:

Example 1

Using 10 Parts by Weight of Polyorganosiloxane

Manufacture of a Seed Latex

Firstly, a 4-mouth flask with a mixer, thermometer, nitrogen input mouth, and circulation condenser mounted is prepared for, into which 48 parts by weight of deionized water (DDI water), 0.04 parts by weight of sodium dodecyl benzene sulfate (SDBS), and 0.025 parts by weight of potassium persulfate were charged. The inner temperature of the above reactor was increased up to 70° C. under the nitrogen atmosphere. A seed latex was manufactured by adding 2.23 parts by weight of styrene (ST), 0.25 parts by weight of acrylonitrile (AN), and 0.02 parts by weight of divinylbenzene (DVB) at the same time when the reactor reaches 70° C.

The polymerization conversion ratio of the seed latex thus manufactured was 99%, the average particle diameter was 73 nm, and the total solid content (TSC) was 5 weight %.

Formation of an Acrylic Rubber Core

A reaction was progressed at a temperature of 70° C. for 4 hours by simultaneously feeding a monomer pre-emulsion containing 20 parts by weight of deionized water (DDI water), 71.96 parts by weight of butylacrylate (BA), 0.54 parts by weight of allylmethacrylate (AMA), and 0.44 parts by weight of sodium dodecyl benzene sulfate (SDBS) manufactured in advance in order to form a butylacrylate rubber core, and 1.09 parts by weight of a separate potassium persulfate, to the seed latex manufactured in the above. After feeding the monomer pre-emulsion and potassium persulfate was completed, the mixture was aged at a temperature of 65° C. for 1 hour to complete the acrylic rubber core portion.

Formation of an Acryl-Silicone Hybrid Core

To the acrylic rubber core polymer portion manufactured in the above, 0.10 part by weight of dodecyl benzene sulfonic acid (DBS), 9.8 parts by weight of octamethylcyclotetrasiloxane (D4), 0.15 parts by weight of tetraethoxysilane (TEOS), and 0.05 parts by weight of γ-methacrylolpropyldimethoxymethylsilane (MADS) were charged and mixed for 30 minutes. After the reaction was progressed at the inner temperature of the reactor of 60° C. for 3 hours, 0.05 parts by weight of sodium carbonate was fed into reactor and neutralized to pH 7.5. When the neutralization was completed, an acryl-silicone hybrid rubber core was manufactured by cooling the mixture at a room temperature for 24 hours.

Formation of a Hard Shell

For shell polymerization, a shell monomer pre-emulsion containing 10 parts by weight of ion-exchange water, 15 parts by weight of methylmethacrylate, 0.04 parts by weight of sodium dodecyl benzene sulfonate (SDBS), 0.015 parts by weight of n-dodecyl mercaptane (nDDM), and 0.09 parts by weight of tert-butylperoxylaurate (TBPL) was manufactured. The temperature of the reactor is increased to 52° C., and 0.15 parts by weight of disodiumethylenediaminetetraacetate (EDTA), 0.008 parts by weight of ferrous sulfate (FeS), and 0.225 parts by weight of formaldehyde sodium sulfoxylate (SFS) were added. The reaction is progressed by dividing equally the monomer pre-emulsion into two and charging them at the same time at an interval of 45 minutes. The particle size of the final acryl-silicone hybrid latex was 248 nm, and the total solid content was 45 weight %.

Example 2

Using 15 Parts by Weight of Polyorganosiloxane

A reaction was progressed at a temperature of 70° C. for 4 hours by simultaneously feeding a monomer pre-emulsion containing 20 parts by weight of deionized water (DDI water), 66.99 parts by weight of butylacrylate (BA), 0.51 parts by weight of allylmethacrylate (AMA), and 0.41 parts by weight of sodium dodecyl benzene sulfonate (SDBS), and 1.01 parts by weight of a separate potassium persulfate of the time of manufacturing the acrylic rubber core, into the seed latex manufactured in the same method as that in Example 1.

To the acrylic rubber core polymer portion manufactured in the above, 0.15 parts by weight of dodecyl benzene sulfonic acid (DBS), 14.7 parts by weight of octamethylcyclotetrasiloxane (D4), 0.225 parts by weight of tetraethoxysilane (TEOS), and 0.075 parts by weight of γ-methacrylolpropyldimethoxymethylsilane (MADS) were charged and mixed for 30 minutes. After the reaction was progressed at the inner temperature of the reactor of 60° C. for 3 hours, 0.08 parts by weight of sodium carbonate is fed into reactor and neutralized to pH 7.5. When the neutralization was completed, an acryl-silicone hybrid rubber core was manufactured by cooling the mixture at a room temperature for 24 hours.

As to hard shell polymerization, a reaction was progressed in the same prescription and method as those in Preferred Embodiment 1. The particle size of the final acryl-silicone hybrid latex was 245 nm, and the total solid content was 46 weight %.

Example 3

Using 20 Parts by Weight of Polyorganosiloxane

A reaction was progressed at a temperature of 70° C. for 4 hours by simultaneously feeding a monomer pre-emulsion containing 20 parts by weight of deionized water (DDI water), 62.03 parts by weight of butylacrylate (BA), 0.47 parts by weight of allylmethacrylate (AMA), and 0.38 parts by weight of sodium dodecyl benzene sulfonate (SDBS), and 0.94 parts by weight of a separate potassium persulfate of the time of manufacturing the acrylic rubber core, into the seed latex manufactured in the same method as that in Example 1.

To the acrylic rubber core polymer portion manufactured in the above, 0.20 parts by weight of dodecyl benzene sulfonic acid (DBS), 19.6 parts by weight of octamethylcyclotetrasiloxane (D4), 0.30 parts by weight of tetraethoxysilane (TEOS), and 0.10 part by weight of γ-methacrylolpropyldimethoxymethylsilane (MADS) were charged and mixed for 30 minutes. After the reaction was progressed at the inner temperature of the reactor of 60° C. for 3 hours, 0.10 parts by weight of sodium carbonate was fed into reactor and neutralized to pH 7.5. When the neutralization was completed, an acryl-silicone hybrid rubber core was manufactured by cooling the mixture at a room temperature for 24 hours.

As to hard shell polymerization, a reaction was progressed in the same prescription and method as those in Example 1. The particle size of the final acryl-silicone hybrid latex was 242 nm, and the total solid content was 46 weight %.

Example 4

Using 25 Parts by Weight of Polyorganosiloxane

A reaction is progressed at a temperature of 70° C. for hours by simultaneously feeding a monomer pre-emulsion containing 20 parts by weight of deionized water (DDI water), 57.07 parts by weight of butylacrylate (BA), 0.43 parts by weight of allylmethacrylate (AMA), and 0.35 parts by weight of sodium dodecyl benzene sulfonate (SDBS), and 0.86 parts by weight of a separate potassium persulfate of the time of manufacturing the acrylic rubber core, into the seed latex manufactured in the same method as that in Example 1.

To the acrylic rubber core polymer portion manufactured in the above, 0.25 parts by weight of dodecyl benzene sulfonic acid (DBS), 24.5 parts by weight of octamethylcyclotetrasiloxane (D4), 0.375 parts by weight of tetraethoxysilane (TEOS), and 0.125 parts by weight of γ-methacrylolpropyldimethoxymethylsilane (MADS) were charged and mixed for 30 minutes. After the reaction was progressed at the inner temperature of the reactor of 60° C. for 3 hours, 0.10 parts by weight of sodium carbonate was fed into reactor and neutralized to pH 7.5. When the neutralization was completed, an acryl-silicone hybrid rubber core was manufactured by cooling the mixture at a room temperature for 24 hours.

As to hard shell polymerization, a reaction was progressed in the same prescription and method as those in Example 1. The particle size of the final acryl-silicone hybrid latex was 246 nm, and the total solid content was 46 weight %.

Comparative Example 1

Manufacture of an Acrylic Single Impact Modifier

A reaction was progressed at a temperature of 70° C. for 5 hours by simultaneously feeding a monomer pre-emulsion containing 20 parts by weight of deionized water (DDI water), 81.88 parts by weight of butylacrylate (BA), 0.62 parts by weight of allylmethacrylate (AMA), and 0.50 parts by weight of sodium dodecyl benzene sulfonate (SDBS), and 1.24 parts by weight of a separate potassium persulfate of the time of manufacturing the acrylic rubber core, into the seed latex manufactured in the same method as that in Example 1.

As to hard shell polymerization, a reaction was progressed in the same prescription and method as those in Example 1. The particle size of the final acrylic single impact modifier latex was 255 nm, and the total solid content is 44 weight %.

Comparative Example 2

Manufacture of a Butadiene Impact Modifier

Into the seed latex manufactured in the same method as that in Example 1 in a high-pressure reactor, 35 parts by weight of deionized water (DDI water), 0.10 part by weight of potassium stearate, 0.20 parts by weight of rosin soap, 0.08 parts by weight of a primary-alkyl mercaptane, 0.40 parts by weight of an electrolyte, and 0.99 parts by weight of potassium persulfate were charged at the time of manufacture of the butadiene rubber core. Then a reaction was progressed by charging 82.5 parts by weight of a butadiene monomer at the inner temperature of the reactor of 72° C. over 24 hours.

As to hard shell polymerization, a reaction was carried out with the same prescription and method as those in Example 1. The particle size of the final butadiene impact modifier latex was 238 nm, and the total solid content was 41 weight %.

Pulverization of an Impact Modifier

After the solid content of the polymerized latex was lowered to 10 parts by weight by adding ion-exchange water into the impact modifier latex manufactured in the above and the temperature was cooled down to 23° C., a coagulated slurry was manufactured through coagulation of polymer particles by inputting a calcium chloride solution (a diluted solution to a concentration of 10 weight %) to this diluted latex while mixing.

The coagulated slurry was heated to 90° C., aged for 20 minutes, and cooled. This was then washed 2 to 3 times with ion-exchange water in order to remove residual monomers and dehydrated by using a filter.

The impact modifier powder was obtained by drying the above dehydrated impact modifier in a fluidized bed dryer at 80° C. for 2 hours.

Example 5

Manufacture of the Vinyl Chloride Resin 100 parts by weight of the polyvinyl chloride resin (PVC; LG Chemical Company manufactured LS-100, degree of polymerization=1,000), 4.0 parts by weight of a thermal stabilizer (DLD), 0.9 parts by weight of calcium stearate (Ca-St), 1.36 parts by weight of polyethylene wax (PE wax), 1.0 parts by weight of a milling agent (LG Chemical Company manufactured PA-822A), 5.0 parts by weight of $CaCO_3$, and 4.0 parts by weight of $TiO_2$ were put into a mixer at a room temperature and mixed at 1,000 rpm while increasing the temperature to 115° C. When the temperature reaches 115° C., the speed of the mixer was lowered to 400 rpm, and the mixer was cooled down to 40° C. to give a master batch.

After adding 6 parts by weight of the impact modifier to the master batch, a milling was carried out at 190° C. for 7 minutes by using a 2-roll mill. The thickness of the resulting sheet was 0.6 mm.

This sheet was cut to a size of 150×200 mm, layered on a 3×170×220 mm mold by having the milling direction constantly, warmed up for 8 minutes (at a pressure of 0.5 Kg) by using a 190° C.-heating press, compressed for 4 minutes (at a pressure of 10 Kgf), and cooled for 3 minutes (at a pressure of 10 Kgf) in order to manufacture a 3-mm-thick vinyl chloride resin sheet.

In order to measure the Izod impact strength, the sheet manufactured in the above was cut precisely according to the ASTM D-256 specification to make impact specimens. The Izod impact strength of the specimens was measured, and the results of measurement were shown in Table 1 below:

For the weatherability test, the specimens manufactured in the above method were exposed to the Sunshine-Weather-Ometer for 300 hours, and the difference between the Izod impact strength values and the difference between yellow colors (ΔYI) were measured. The results of measurement were shown in Table 1 below:

TABLE 1

| Content (parts by weight) | | Example 1 | Example 2 | Example 3 | Example 4 |
|---|---|---|---|---|---|
| Seed | St | | 2.23 | | |
| | AN | | 0.25 | | |
| | DVB | | 0.02 | | |
| Acrylic Rubber Core | BA | 71.96 | 66.99 | 62.03 | 57.07 |
| | AMA | 0.54 | 0.51 | 0.47 | 0.43 |
| Butadiene Rubber Core | BD | — | — | — | — |
| Polyorgano Siloxane | D4 | 9.8 | 14.7 | 19.6 | 24.5 |
| | TEOS | 0.15 | 0.23 | 0.30 | 0.38 |
| | MADS | 0.05 | 0.075 | 0.10 | 0.125 |
| Hard shell | MMA | 15 | 15 | 15 | 15 |
| Izod (kg · cm/cm) 0 hour exposure | 23° C. | 125 | 131 | 143 | 146 |
| | 0° C. | 48 | 53 | 70 | 78 |
| Izod (kg · cm/cm) 300 hours exposure | 23° C. | 67 | 76 | 91 | 96 |
| | 0° C. | 30 | 31 | 46 | 58 |
| ΔYI 300 hours exposure | | 18 | 17 | 11 | 9 |

| Content (parts by weight) | | Comparative Example 1 | Comparative Example 2 |
|---|---|---|---|
| Seed | St | | 2.23 |
| | AN | | 0.25 |
| | DVB | | 0.02 |
| Acrylic Rubber Core | BA | 81.88 | — |
| | AMA | 0.62 | |
| Butadiene Rubber Core | BD | — | 82.5 |
| Polyorgano Siloxane | D4 | — | — |
| | TEOS | | |
| | MADS | | |
| Hard shell | MMA | 15 | 15 |
| Izod (kg · cm/cm) 0 hour exposure | 23° C. | 98 | 128 |
| | 0° C. | 29 | 37 |
| Izod (kg · cm/cm) 300 hours exposure | 23° C. | 53 | 41 |
| | 0° C. | 20 | 15 |
| ΔYI 300 hours exposure | | 31 | 106 |

In the above-described Examples 1 to 4, in case that an acryl-silicone hybrid impact modifier was added to the vinyl chloride resin, its impact resistance and weatherability were superior to those of an acryl single impact modifier in Comparative Example 1 and a butadiene impact modifier in Comparative Example 2.

Example 6

Using the Total Content of 77.5 Parts by Weight of an Acryl-Silicone Complex Rubber Core A reaction was progressed at a temperature of 70° C. for 3 hours and 30 minutes by simultaneously feeding a monomer pre-emulsion containing 20 parts by weight of deionized water (DDI water), 66.99 parts by weight of butylacrylate (BA), 0.51 parts by weight of allylmethacrylate (AMA), and 0.41 parts by weight of sodium dodecyl benzene sulfonate (SDBS), and 1.01 parts by weight of a separate potassium persulfate, into the seed latex manufactured in the same method as that in Example 1 at the time of manufacturing the acrylic rubber core.

An acryl-silicone hybrid rubber core was manufactured by applying the same prescription and method as those in Example 1 to the acrylic rubber core polymer portion manufactured in the above.

As to hard shell polymerization, a shell monomer pre-emulsion containing 10 parts by weight of ion-exchange water, 20 parts by weight of methylmethacrylate, 0.05 parts by weight of sodium dodecyl benzene sulfonate (SDBS), 0.02 parts by weight of n-dodecyl mercaptane (nDDM), and 0.12 parts by weight of tert-butylperoxylaurate (TBPL) was manufactured. The temperature of the reactor was increased to 52° C., and 0.20 parts by weight of disodiumethylenediaminetetraacetate (EDTA), 0.01 parts by weight of ferrous sulfate (FeS), and 0.30 parts by weight of formaldehyde sodium sulfoxylate (SFS) were put therein. Then a reaction was progressed by dividing the monomer pre-emulsion equally into two and charging them at the same time at an interval of 50 minutes.

Example 7

Using the Total Content of 85 Parts by Weight of an Acryl-Silicone Hybrid Rubber Core A reaction was progressed at a temperature of 70° C. for 4 hours and 20 minutes by simultaneously feeding a monomer pre-emulsion containing 20 parts by weight of deionized water (DDI water), 74.44 parts by weight of butylacrylate (BA), 0.56 parts by weight of allylmethacrylate (AMA), and 0.45 parts by weight of sodium dodecyl benzene sulfonate (SDBS), and 1.13 parts by weight of a separate potassium persulfate, into the seed latex manufactured in the same method as that in Example 1 at the time of manufacturing the acrylic rubber core.

An acryl-silicone hybrid rubber core was manufactured by applying the same prescription and method as those in Preferred Embodiment 1 to the acrylic rubber core polymer portion manufactured in the above.

As to hard shell polymerization, a shell monomer pre-emulsion containing 10 parts by weight of ion-exchange water, 12.50 parts by weight of methylmethacrylate, 0.03 parts by weight of sodium dodecyl benzene sulfonate (SDBS), 0.0125 parts by weight of n-dodecyl mercaptane (nDDM), and 0.075 parts by weight of tert-butylperoxylaurate (TBPL) was manufactured. The temperature of the reactor was increased to 52° C., and 0.125 parts by weight of disodiumethylenediaminetetraacetate (EDTA), 0.0063 parts by weight of ferrous sulfate (FeS), and 0.1875 parts by weight of formaldehyde sodium sulfoxylate (SFS) were put therein. Then a reaction was progressed by dividing the monomer pre-emulsion equally into two and charging them at the same time at an interval of 40 minutes.

Example 8

Using the Total Content of 87.5 Parts by Weight of an Acryl-Silicone Hybrid Rubber Core A reaction was progressed at a temperature of 70° C. for 4 hours and 30 minutes by simultaneously feeding a monomer pre-emulsion containing 20 parts by weight of deionized water (DDI water), 76.92 parts by weight of butylacrylate (BA), 0.58 parts by weight of allylmethacrylate (AMA), and 0.47 parts by weight of sodium dodecyl benzene sulfonate (SDBS), and 1.16 parts by weight of a separate potassium persulfate, into the seed latex manufactured in the same method as that in Example 1 at the time of manufacturing the acrylic rubber core.

An acryl-silicone hybrid rubber core was manufactured by applying the same prescription and method as those in Example 1 to the acrylic rubber core polymer portion manufactured in the above.

As to hard shell polymerization, a shell monomer pre-emulsion containing 10 parts by weight of ion-exchange water, 10 parts by weight of methylmethacrylate, 0.03 parts by weight of sodium dodecyl benzene sulfonate (SDBS), 0.01 part by weight of n-dodecyl mercaptane (nDDM), and 0.06 parts by weight of tert-butylperoxylaurate (TBPL) was manufactured. The temperature of the reactor was increased to 52° C., and 0.10 parts by weight of disodiumethylenediaminetetraacetate (EDTA), 0.005 parts by weight of ferrous sulfate (FeS), and 0.150 parts by weight of formaldehyde sodium sulfoxylate (SFS) were put therein. Then a reaction was progressed by dividing the monomer pre-emulsion equally into two and charging them at the same time at an interval of 40 minutes.

Example 9

Using the Total Content of 90 Parts by Weight of an Acryl-Silicone Hybrid Rubber Core A reaction was progressed at a temperature of 70° C. for 4 hours and 45 minutes by simultaneously feeding a monomer pre-emulsion containing 20 parts by weight of deionized water (DDI water), 79.40 parts by weight of butylacrylate (BA), 0.60 parts by weight of allylmethacrylate (AMA), and 0.48 parts by weight of sodium dodecyl benzene sulfonate (SDBS), and 1.20 parts by weight of a separate potassium persulfate, into the seed latex manufactured in the same method as that in Example 1 at the time of manufacturing the acrylic rubber core.

An acryl-silicone hybrid rubber core was manufactured by applying the same prescription and method as those in Example 1 to the acrylic rubber core polymer portion manufactured in the above.

As to hard shell polymerization, a shell monomer pre-emulsion containing 10 parts by weight of ion-exchange water, 7.50 parts by weight of methylmethacrylate, 0.02 parts by weight of sodium dodecyl benzene sulfonate (SDBS), 0.0075 parts by weight of n-dodecyl mercaptane (nDDM), and 0.045 parts by weight of tert-butylperoxylaurate (TBPL) was manufactured. The temperature of the reactor was increased to 52° C., and 0.075 parts by weight of disodiumethylenediaminetetraacetate (EDTA), 0.0038 parts by weight of ferrous sulfate (FeS), and 0.1125 parts by weight of formaldehyde sodium sulfoxylate (SFS) were put therein. Then a reaction was progressed by dividing the monomer pre-emulsion equally into two and charging them at the same time at an interval of 40 minutes.

Comparative Example 3

Using the Total Content of 47.5 Parts by Weight of an Acryl-Silicone Hybrid Rubber Core A reaction was progressed at a temperature of 70° C. for 3 hours by simultaneously feeding a monomer pre-emulsion containing 20 parts by weight of deionized water (DDI water), 37.22 parts by weight of butylacrylate (BA), 0.28 parts by weight of allylmethacrylate (AMA), and 0.23 parts by weight of sodium dodecyl benzene sulfonate (SDBS), and 0.56 parts by weight of a separate potassium persulfate, into the seed latex manufactured in the same method as that in Example 1 at the time of manufacturing the acrylic rubber core.

An acryl-silicone hybrid rubber core was manufactured by applying the same prescription and method as those in Example 1 to the acrylic rubber core polymer portion manufactured in the above.

As to hard shell polymerization, a shell monomer pre-emulsion containing 10 parts by weight of ion-exchange water, 50 parts by weight of methylmethacrylate, 0.13 parts by weight of sodium dodecyl benzene sulfonate (SDBS), 0.05 parts by weight of n-dodecyl mercaptane (nDDM), and 0.30 parts by weight of tert-butylperoxylaurate (TBPL) was manufactured. The temperature of the reactor was increased to 52° C., and 0.50 parts by weight of disodiumethylenediaminetetraacetate (EDTA), 0.025 parts by weight of ferrous sulfate (FeS), and 0.75 parts by weight of formaldehyde sodium sulfoxylate (SFS) were put therein. Then a reaction was progressed by dividing the monomer pre-emulsion equally into two and charging them at the same time at an interval of 80 minutes.

Comparative Example 4

Using the Total Content of 57.5 Parts by Weight of an Acryl-Silicone Hybrid Rubber Core A reaction was progressed at a temperature of 70° C. for 2 hours and 40 minutes by simultaneously feeding a monomer pre-emulsion containing 20 parts by weight of deionized water (DDI water), 47.14 parts by weight of butylacrylate (BA), 0.36 parts by weight of allylmethacrylate (AMA), and 0.29 parts by weight of sodium dodecyl benzene sulfonate (SDBS), and 0.71 parts by weight of a separate potassium persulfate, into the seed latex manufactured in the same method as that in Example 1 at the time of manufacturing the acrylic rubber core.

An acryl-silicone hybrid rubber core was manufactured by applying the same prescription and method as those in Example 1 to the acrylic rubber-core polymer portion manufactured in the above.

As to hard shell polymerization, a shell monomer pre-emulsion containing 10 parts by weight of ion-exchange water, 40 parts by weight of methylmethacrylate, 0.10 part by weight of sodium dodecyl benzene sulfonate (SDBS), 0.040 parts by weight of n-dodecyl mercaptane (nDDM), and 0.24 parts by weight of tert-butylperoxylaurate (TBPL) was manufactured. The temperature of the reactor was increased to 52° C., and 0.40 parts by weight of disodiumethylenediaminetetraacetate (EDTA), 0.020 parts by weight of ferrous sulfate (FeS), and 0.60 parts by weight of formaldehyde sodium sulfoxylate (SFS) were put therein. Then a reaction was progressed by dividing the monomer pre-emulsion equally into two and charging them at the same time at an interval of 60 minutes.

Example 10

Separation of Acryl-Silicone Hybrid Impact Modifier Particles by Spray-Drying

The sodium alkyl sulphate solution was added into the impact modifier latex manufactured in the above Examples 6, 7, 8, and 9 and Comparative Examples 3 and 4. The above latex was injected into a spray-dryer at a feed rate of 100 liters/hr and calcium carbonate of which surface was processed with stearic acid as a flow aid was sprayed into the air-ventilation inlet simultaneously. The Spray-drying was performed under the operational conditions of the chamber inlet temperature of 155° C., the outlet temperature of 55° C., and the rotary rotation speed of 20,000 rpm. Under the above conditions, the impact modifier powder having a superior flow and no compression was obtained.

In order to find out powder characteristics of the impact modifier powder obtained, the bulk density, powder compaction, and powder flow were tested. The bulk density was shown in a unit of g/cc by dividing the powder weight gram (g) in a 100-cc cup by 100. The powder compaction was obtained by inputting 30 g of the impact modifier powder in a cup, tapping it for 3 minutes with a weight of 3.5 Kg, putting it on a 18-mesh screen, and vibrating it for 100 seconds in terms of a ratio (%) of the weight remaining on the screen to the initial weight. The powder flow was measured by employing the funnel flow test of ASTM D-1895. The results of measurement in the above methods were shown in Table 2 below:

TABLE 2

| Content (parts by weight) | | Comparative Example 3 | Comparative Example 4 | Example 6 | Example 7 | Example 8 | Example 9 |
|---|---|---|---|---|---|---|---|
| Seed | St | | | | 2.23 | | |
| | AN | | | | 0.25 | | |
| | DVB | | | | 0.02 | | |
| Acrylic Rubber Core | BA | 37.22 | 47.14 | 66.99 | 74.44 | 76.92 | 79.40 |
| | AMA | 0.28 | 0.36 | 0.51 | 0.56 | 0.58 | 0.60 |
| Polyorgano Siloxane | D4 | | | | 9.8 | | |
| | TEOS | | | | 0.15 | | |
| | MADS | | | | 0.05 | | |
| Acryl-silicone hybrid rubber core content | | 47.5 | 57.5 | 77.5 | 85 | 87.5 | 90 |
| Hard Cell | MMA | 50 | 40 | 20 | 12.5 | 10 | 7.5 |
| Bulk Density (g/cc) | | 0.51 | 0.50 | 0.48 | 0.50 | 0.49 | 0.48 |
| Compaction (%) | | 8 | 11 | 9 | 8 | 10 | 12 |
| Powder Flow (sec) | | 15 | 12 | 16 | 15 | 18 | 19 |

TABLE 2-continued

| Content | | Comparative Example | | Example | | | |
|---|---|---|---|---|---|---|---|
| (parts by weight) | | 3 | 4 | 6 | 7 | 8 | 9 |
| Izod Impact Strength (kg · cm/cm) | 23° C. | 75 | 89 | 115 | 129 | 132 | 133 |
| | 0° C. | 19 | 23 | 44 | 49 | 48 | 54 |

As shown in Table 2, as in Comparative Examples 3 and 4, impact resistance was low in case that the content of the acryl-silicone hybrid rubber core was less than 60 parts by weight.

Examples 11 to 15 and Comparative Examples 5 and 6

The seed and acrylic rubber core were manufactured in the same prescription and method as those in Example 2. Polymerization was done by varying the content of γ-methacrylolpropyldimethoxymethylsilane (MADS), which was a graft-linking agent, in view of the prescription of polyorganosiloxane at the time of manufacture of the acryl-silicone hybrid rubber core.

As to hard shell polymerization, a reaction was progressed in the same prescription and method as those in Preferred Embodiment 2 in order to manufacture the final acryl-silicone hybrid impact modifier particle dispersion.

Sol-Gel Separation

The acryl-silicone hybrid impact modifier manufactured in the above examples and comparative examples was separated into particles and dried, soaked in toluene at room temperature and swollen for 24 hours, and centrifuged at 0° C. and 12,000 rpm for 120 minutes. The toluene-insoluble gel and toluene-soluble sol were taken and dried with a hot-wind dryer. The values were obtained from the following equations, and the results were shown in Table 3 below:

Gel content (%)=(Weight of dried gel/Total weight of impact modifier)×100

Swelling index=Weight of toluene-swollen gel/Weight of dried gel

Grafting efficiency (%)=(Total weight of grafted monomers/Total weight of shell monomers)×100

Measurement of Gloss

The relative surface gloss value (%) of the specimens manufactured in the method in Example 5 with the glass surface gloss regarded to be 100% was obtained according to ASTM D-523-62T.

TABLE 3

| Content (parts by weight) | | Comparative Example 5 | Comparative Example 6 |
|---|---|---|---|
| Seed | St | 2.23 | |
| | AN | 0.25 | |
| | DVB | 0.02 | |
| Acrylic rubber core | BA | 66.99 | |
| | AMA | 0.51 | |
| Polyorgano Siloxane | D4 | 14.775 | 14.7525 |
| | TEOS | 0.225 | 0.225 |
| | MADS | 0 | 0.0225 |
| Hard Cell | MMA | 15 | |
| Gel Content % | | 84.6 | 86.3 |
| Swell Index | | 6.2 | 6.7 |
| Graft Efficiency % | | 14 | 25 |
| Gloss % | | 16 | 24.7 |
| Izod Impact Strength (kg · cm/cm) | 23° C. | 108 | 115 |
| | 0° C. | 32 | 38 |

| Content (parts by weight) | | Example | | | | |
|---|---|---|---|---|---|---|
| | | 11 | 12 | 13 | 14 | 15 |
| Seed | St | | | 2.23 | | |
| | AN | | | 0.25 | | |
| | DVB | | | 0.02 | | |
| Acrylic rubber core | BA | | | 66.99 | | |
| | AMA | | | 0.51 | | |
| Polyorgano Siloxane | D4 | 14.715 | 14.6625 | 14.625 | 14.475 | 14.325 |
| | TEOS | 0.225 | 0.225 | 0.225 | 0.225 | 0.225 |
| | MADS | 0.06 | 0.1125 | 0.150 | 0.30 | 0.45 |
| Hard Cell | MMA | | | 15 | | |
| Gel Content % | | 88.2 | 89.6 | 89.1 | 89.4 | 89.3 |
| Swell Index | | 6.5 | 6.5 | 6.4 | 6.3 | 6.5 |
| Graft Efficiency % | | 39 | 47 | 44 | 46 | 45 |
| Gloss % | | 41 | 48 | 53 | 58 | 62.5 |
| Izod Impact Strength (kg · cm/cm) | 23° C. | 129 | 137 | 135 | 136 | 135 |
| | 0° C. | 48 | 58 | 56 | 54 | 55 |

As shown in Table 3, as in Comparative Examples 5 and 6, gloss and impact resistance were lowered since the grafting efficiency was not sufficient in case that the content of the organosilane graft-linking agent was less than 0.25 parts by weight (based on the parts by weight of the silicone rubber core).

Examples 16 to 19

The seed and acrylic rubber core were manufactured in the same prescription and method as those in Example 12. Polymerization was done by fixing the content of the graft-linking agent to 0.1125 parts by weight and using a graft-linking agent other than γ-methacrylolpropyldimethoxymethylsilane (MADS) in view of the prescription of polyorganosiloxane at the time of manufacture of the acryl-silicone hybrid rubber core.

As to hard shell polymerization, a reaction was progressed in the same prescription and method as those in Example 11 in order to manufacture the final acryl-silicone hybrid impact modifier particle dispersion.

TABLE 4

| Content (parts by weight) | | Example 16 | Example 17 | Example 18 | Example 19 |
|---|---|---|---|---|---|
| Seed | St | | 2.23 | | |
| | AN | | 0.25 | | |
| | DVB | | 0.02 | | |
| Acrylic Rubber Core | BA | | 66.99 | | |
| | AMA | | 0.51 | | |
| Poly-organo Siloxane | D4 | 14.6625 | 14.6625 | 14.6625 | 14.6625 |
| | TEOS | 0.225 | 0.225 | 0.225 | 0.225 |
| | 1. MATS | 0.1125 | — | — | — |
| | 2. MPrDS | — | 0.1125 | — | — |
| | 3. MPrTS | — | — | 0.1125 | — |
| | 4. VD4 | — | — | — | 0.1125 |
| Hard Cell | MMA | | 15 | | |
| Gel Content % | | 89.3 | 89 | 88.5 | 87.9 |
| Swell Index | | 6.2 | 5.9 | 5.8 | 6.1 |
| Graft Efficiency % | | 45 | 44 | 41 | 38 |
| Gloss % | | 47 | 44 | 41 | 40 |
| Izod | 23° C. | 134 | 135 | 132 | 129 |
| Impact Strength (kg·cm/cm) | 0° C. | 56 | 52 | 53 | 51 |

Note)
Types of graft-linking agents
1. MATS (γ-Methacrylolpropyltrimethoxysilane)
2. MPrDS (Mercaptopropyldimethoxymethylsilane)
3. MPrTS (Mercaptopropyltrimethoxysilane)
4. VD4 (Tetravinyltetramethylcyclotetrasiloxane)

In Table 4, both of impact resistance and gloss were superior even if different types of graft-linking agents were used.

Examples 20 to 27 and Comparative Examples 7 to 10

The seed and acrylic rubber core were manufactured in the same prescription and method as those in Example 8. Polymerization was done by varying the types of cyclic organosiloxane precursors and of organosilane cross-linking agents at the time of manufacture of the acryl-silicone hybrid rubber core.

As to hard shell polymerization, a reaction was progressed in the same prescription and method as those in Example 8 in order to manufacture the final acryl-silicone hybrid impact modifier particle dispersion.

TABLE 5

| Content (parts by weight) | | Example 8 | 20 | 21 | 22 | 23 | 24 | 25 | 26 | 27 |
|---|---|---|---|---|---|---|---|---|---|---|
| Seed | ST | | | | | 2.23 | | | | |
| | AN | | | | | 0.25 | | | | |
| | DVB | | | | | 0.02 | | | | |
| Acrylic Rubber Core | BA | | | | | 76.92 | | | | |
| | AMA | | | | | 0.58 | | | | |
| Poly Organo Siloxane | 1. D4 | 9.80 | 9.80 | 9.80 | | | 4.90 | | 4.90 | 8.82 |
| | 2. D5 | | | | 9.80 | | 4.90 | 4.90 | | |
| | 3. D6 | | | | | 9.80 | | 4.90 | 4.90 | |
| | 4. PD4 | | | | | | | | | 0.98 |
| | 5. TMOS | | | 0.15 | | | | | | |
| | 6. TEOS | 0.15 | | | | 0.15 | 0.15 | 0.15 | 0.15 | 0.15 |
| | 7. TEMS | | | | 0.15 | | | | | |
| | MADS | 0.05 | 0.05 | 0.05 | 0.05 | 0.05 | 0.05 | 0.05 | 0.05 | 0.05 |
| Hard Cell | MMA | | | | | 10 | | | | |
| Gel Content % | | 92.2 | 92.1 | 92.3 | 92.5 | 92.4 | 92.3 | 92.8 | 92.7 | 93 |
| Swell Index | | 6.1 | 6.3 | 6.4 | 6.7 | 6.4 | 6.4 | 6.5 | 6.3 | 6.6 |
| Graft Efficiency % | | 47 | 46 | 48 | 50 | 49 | 48 | 53 | 52 | 55 |
| Izod | 23□ | 128 | 132 | 136 | 133 | 134 | 132 | 135 | 131 | 138 |
| Impact Strength (kg·cm/cm) | 0□ | 48 | 52 | 57 | 53 | 54 | 56 | 55 | 53 | 60 |

| Content (parts by weight) | | Comparative Example 7 | 8 | 9 | 10 |
|---|---|---|---|---|---|
| Seed | ST | | | 2.23 | |
| | AN | | | 0.25 | |
| | DVB | | | 0.02 | |
| Acrylic Rubber Core | BA | | | 76.92 | |
| | AMA | | | 0.58 | |
| Poly Organo Siloxane | 1. D4 | 10 | | | |
| | 2. D5 | | | | |
| | 3. D6 | | | | |
| | 4. PD4 | | | | |
| | 5. TMOS | | 10 | | |
| | 6. TEOS | | | 10 | |
| | 7. TEMS | | | | 10 |
| | MADS | — | — | — | — |
| Hard Cell | MMA | | | 10 | |
| Gel Content % | | 90.4 | 89.9 | 90.1 | 90.5 |

TABLE 5-continued

| Swell Index | | 7.7 | 3.7 | 4.1 | 4.3 |
|---|---|---|---|---|---|
| Graft Efficiency % | | 29 | 24 | 26 | 30 |
| Izod | 23° C. | 102 | 87 | 97 | 96 |
| Impact Strength (kg · cm/cm) | 0° C. | 39 | 29 | 31 | 35 |

Note)
<Types of cyclic organosiloxane precursors>
1. D4 (Octamethylcyclotetrasiloxane)
2. D5 (Decamethylcyclopentasiloxane)
3. D6 (Dodecamethylcyclohexasiloxane)
4. PD4 (Tetramethyltetraphenylcyclotetrasiloxane)
<Types of organosilane cross-linking agents>
5. TMOS (Tetramethoxysilane)
6. TEOS (Tetraethoxysilane)
7. TEMS (Triethoxymethylsilane)

In Examples 20 to 27 shown in Table 5, all of impact resistances were superior even if different types of cyclic organosiloxane precursors and their mixtures and different types of organosilane cross-linking agents were used. In Comparative Examples 7 to 10, impact resistance was lowered in case that each of a cyclic organosiloxane precursor and an organosilane cross-linking agent was used independently.

As illustrated in the above, the acryl-silicon hybrid impact modifier and the method of its manufacture according to the present invention was a useful invention having an effect of granting remarkable impact resistance, weatherability, and gloss characteristics to thermoplastic resins, particularly, vinyl chloride resins.

While certain examples and comparative examples of the present invention have been shown and described, it is to be distinctly understood that the invention is not limited thereto but may be otherwise variously embodied and practiced within the scope of the following claims.

What is claimed is:

1. An acryl-silicone hybrid impact modifier having improved impact resistance and coloring property comprising:
   (A) an acryl seed latex,
   (B) a core comprising
      (i) 55.0 to 97.5 parts by weight of a continuous acryl rubber core placed on the acryl seed latex of (A)
      (ii) 2.5 to 45.0 parts by weight of a discrete silicone rubber core placed into and onto the continuous acryl rubber core (i); and
   (C) a graft shell placed on the continuous acryl rubber core of (B)(i) having the discrete silicone rubber core of (B)(ii) therein, and the discrete silicone rubber core of (B)(ii) placed onto the continuous acryl rubber core of (B)(i);
   wherein the continuous acryl rubber core of B(i) is prepared by emulsion polymerization reaction between 0.01 to 10 parts by weight of the acryl seed latex of (A), 57.07 to 79.40 parts by weight of an alkyl acrylate having an alkyl group of 1 to 8 carbon atoms, and 0.43 to 0.60 parts by weight of a cross-linking monomer, based on the weight of the entire impact modifier,
   wherein the discrete silicone rubber core of (B)(ii) is prepared by swelling
   a cyclic organosiloxane precursor of:
      0.98 to 24.50 parts by weight of a 3 to 7 member cyclic organosiloxane,
      0.15 to 0.38 parts by weight of an organosiloxane cross-linking agent having an alkyl group of 3 or more carbon atoms, and
      0.05 to 0.45 parts by weight of an organosiloxane graft-linking agent, based on the weight of the entire impact modifier,
   in the acryl rubber core, then condensing the swells with an acid catalyst selected from the group consisting of alkylbenzene sulfonic acid and alkylsulfonic acid,
   wherein the glass transition temperature of the core is −120° C. to 25° C., and
   wherein the graft shell of (C) is prepared by emulsion graft polymerization reaction of 60 to 94 parts by weight of the core (B), 7.5 to 20 parts by weight of an alkyl methacrylate having an alkyl group of 1 to 4 carbon atoms, and 0.1 to 20 parts by weight of one or more compounds selected from the group consisting of methylacrylate, ethylacrylate, butylacrylate, acrylonitrile, and methacrylonitrile, based on the weight of the entire impact modifier.

2. The impact modifier having improved impact resistance and coloring property according to claim 1, wherein said acryl seed latex comprises a vinyl monomer of one or more compounds selected from the group consisting of styrene, α-methylstyrene, vinyl toluene, and 3,4-dichlorostyrene.

3. The impact modifier having improved impact resistance and coloring property according to claim 1, wherein said acryl seed latex comprises a hydrophilic monomer of one or more compounds selected from the group consisting of ethylacrylate, butylacrylate, and 2-ethylhexylacrylate, methylmethacrylate, benzylmethacrylate, acrylonitrile, hydroxylmethylmethacrylate, and glycidylmethacrylate; and a cross linking monomer of one or more compounds selected from the group consisting of divinylbenzene, 3-butanediol diacrylate, 1,3-butanediol dimethacrylate, 1,4-butanediol diacrylate, 1,4-butanediol dimethacrylate, allylacrylate, arylmethacrylate, trimethylolpropane triacrylate, tetraethyleneglycol diacrylate, and tetraethyleneglycol dimethacrylate.

4. The acryl-silicone hybrid impact modifier having improved impact resistance and coloring property according to claim 1, wherein said alkyl acrylate having an alkyl group of 1 to 8 carbon atoms is one or more compounds selected from the group consisting of methylacrylate, ethylacrylate, propylacrylate, iso-propylacrylate, butylacrylate, hexylacrylate, octylacrylate, and 2-ethylhexylacrylate.

5. The impact modifier having improved impact resistance and coloring property according to claim 1, wherein said cross-linking monomer is one or more compounds selected from the group consisting of divinylbenzene, 3-butanediol diacrylate, 1,3-butanediol dimethacrylate, 1,4-butanediol diacrylate, 1,4-butanediol dimethacrylate, allylacrylate, arylmethacrylate, trimethylolpropane triacrylate, tetraethyleneglycol diacrylate, and tetraethyleneglycol dimethacrylate.

6. A vinyl chloride resin composition having improved impact resistance and coloring property comprising 80 to 99 parts by weight of a vinyl chloride resin, and 1 to 20 parts by weight of said impact modifier of claims 1.

7. The impact modifier having improved impact resistance and coloring property according to claim 1, wherein said 3 to 7 member cyclic organosiloxane is one or more selected from octamethylcyclotetrasiloxane, decamethylcyclopentasiloxane, dodecamethylcyclohexasiloxane, and tetramethyltetraphenylcyclotetrasiloxane; the organosiloxane cross-linking agent is one or more selected from group consisting of tetramethoxysilane, tetraethoxysilane, and triethoxymethylsilane; and the organosiloxane graft-linking agent is one or more selected from group consisting of gamma-methacryloxypropyltrimethoxysilane, mercaptopropyldimethoxymethylsilane, mercaptopropyltrimethoxylsilane, and tetravinyltetramethylcyclotetrasiloxane.

\* \* \* \* \*